(12) United States Patent
Margolin

(10) Patent No.: US 12,346,776 B2
(45) Date of Patent: Jul. 1, 2025

(54) TRAINING DATA AUGMENTATION FOR MACHINE LEARNING

(71) Applicant: PayPal, Inc., San Jose, CA (US)

(72) Inventor: Itay Margolin, Pardesiya (IL)

(73) Assignee: PayPal, Inc., San Jose, CA (US)

( * ) Notice: Subject to any disclaimer, the term of this patent is extended or adjusted under 35 U.S.C. 154(b) by 1080 days.

(21) Appl. No.: 16/953,030

(22) Filed: Nov. 19, 2020

(65) Prior Publication Data
US 2022/0156634 A1    May 19, 2022

(51) Int. Cl.
*G06N 20/00* (2019.01)
*G06F 21/52* (2013.01)
*G06F 21/62* (2013.01)

(52) U.S. Cl.
CPC ......... *G06N 20/00* (2019.01); *G06F 21/6245* (2013.01); *G06F 21/52* (2013.01)

(58) Field of Classification Search
CPC ...... G06N 20/00; G06F 21/6245; G06F 21/52
See application file for complete search history.

(56) References Cited

U.S. PATENT DOCUMENTS

| | | | |
|---|---|---|---|
| 2004/0096107 A1* | 5/2004 | Ii | G06F 18/211 382/224 |
| 2014/0040269 A1 | 2/2014 | Sundaresan et al. | |
| 2019/0197585 A1 | 6/2019 | Sylvester, II et al. | |
| 2019/0327501 A1* | 10/2019 | Walters | G06N 3/08 |
| 2019/0362242 A1* | 11/2019 | Pillai | G06N 5/01 |
| 2020/0005195 A1 | 1/2020 | Fang et al. | |
| 2020/0043155 A1* | 2/2020 | Fox | H04L 67/306 |
| 2020/0387760 A1* | 12/2020 | Kamdar | G06F 18/2411 |
| 2021/0158076 A1* | 5/2021 | Lohia | G06F 18/23213 |
| 2021/0182730 A1* | 6/2021 | Clarke | G06N 20/00 |
| 2021/0287084 A1* | 9/2021 | Sivakumar | G06N 3/04 |
| 2021/0319333 A1* | 10/2021 | Lee | G06N 3/08 |
| 2023/0088561 A1* | 3/2023 | Ickin | G06N 3/098 706/12 |

OTHER PUBLICATIONS

Li et al., Federated Learning Challenges, methods, and future directions, Apr. 28, 2020, IEEE, DOI: 10.1109/MSP.2020.2975749 (Year: 2020).*

* cited by examiner

*Primary Examiner* — Michael W Ayers
*Assistant Examiner* — William P Plefka
(74) *Attorney, Agent, or Firm* — Kowert, Hood, Munyon, Rankin & Goetzel, P.C.; Catherine L. Gerhardt; Dean M. Munyon

(57) ABSTRACT

Techniques are disclosed relating to training a machine learning model to understand one or more rules without explicitly executing the rule. In some embodiments, a computer system generates synthetic samples for a trained machine learning model usable to make a classification decision, where the synthetic samples are generated from a rule and a set of existing samples. In some embodiments, the set of existing samples are selected based on exceeding a confidence threshold for the classification decision. In some embodiments, the computer system retrains the trained machine learning model using the synthetic samples.

20 Claims, 10 Drawing Sheets

Features 212

| Name 202 | Age 204 | Address 206 | Occupation 208 | Label 210 |
|---|---|---|---|---|
| Erika | 24 | 222 Erika Ave | Social Worker | 0 |
| Jane | 47 | 444 Jane Street | Engineer | 1 |
| John | 21 | 123 John Drive | Computer Science | 0 |
| Boris | 35 | 555 Boris Ave | Nurse | 1 |

Existing Samples 200A

*Fig. 2A*

Features 212

| Name 202 | Address 206 | Occupation 208 | Label 210 |
|---|---|---|---|
| Erika | 222 Erika Ave | Social Worker | 0 |
| Jane | 444 Jane Street | Engineer | 1 |
| John | 123 John Drive | Computer Science | 0 |
| Boris | 555 Boris Ave | Nurse | 1 |

Reduced-feature Set of Existing Samples 200B

*Fig. 2B*

Classifications for Reduced-feature Set 200C

Features 212

| Name 202 | Address 206 | Occupation 208 | Label 210 | Scores 220 |
|---|---|---|---|---|
| Erika | 222 Erika Ave | Social Worker | 0 | 0.43 |
| Jane | 444 Jane Street | Engineer | 1 | 0.9 |
| John | 123 John Drive | Computer Science | 0 | 0.5 |
| Boris | 555 Boris Ave | Nurse | 1 | 0.85 |

Set of Existing Samples 252 (Exceeding Confidence Threshold 132) — brackets Jane and Boris rows

*Fig. 2C*

Synthetic Training Samples 200D

Features 212

| Name 202 | Age 204 | Address 206 | Occupation 208 | Label 210 |
|---|---|---|---|---|

| Jane | 24 | 444 Jane Street | Engineer | 1 |
| Boris | 21 | 555 Boris Ave | Nurse | 1 |

Copies of Set of Existing Samples 254 (Exceeding Confidence Threshold 132)

Inserted Age Values 230 (From Existing Samples in Table 200A)

*Fig. 2D*

*Augmented Set of Training Samples 200E*

Features 212

| Name 202 | Age 204 | Address 206 | Occupation 208 | Label 210 | Weight 232 |
|---|---|---|---|---|---|
| Erika | 24 | 222 Erika Ave | Social Worker | 0 | 1 |
| Jane | 47 | 444 Jane Street | Engineer | 1 | 1 |
| John | 21 | 123 John Drive | Computer Science | 0 | 1 |
| Boris | 35 | 555 Boris Ave | Nurse | 1 | 1 |
| Jane | 24 | 444 Jane Street | Engineer | 1 | 2 |
| Boris | 21 | 555 Boris Ave | Nurse | 1 | 2 |

Synthetic Samples 214

*Method 500*

Generate synthetic samples for a trained machine learning model usable to make a classification decision, where the synthetic samples are generated from a rule and a set of existing samples, and where the set of existing samples are selected based on exceeding a confidence threshold for the classification decision.
510

Retrain the trained machine learning model using the synthetic samples.
520

*Fig. 5*

Method 600

Generate, from an initial set of samples used to train a machine learning model, an augmented set of samples.
610

- Remove a particular feature from one or more of the initial set of samples to generate a reduced-feature set of training samples.
  620

- Determine classification scores for samples in the reduced-feature set of samples.
  630

- Select a group of the reduced-feature set of samples that meet a confidence threshold.
  640

- Generate synthetic samples by reinserting the particular feature into samples in the selected group.
  650

- Add the synthetic samples to the initial set of samples to generate the augmented set of samples.
  660

Retrain the trained machine learning model using the augmented set of samples.
670

*Fig. 6*

*Method 700*

Generate synthetic samples for a machine learning model trained to make a classification decision based on existing samples, where the synthetic samples are generated from a token and a set of the existing samples, where the set of the existing samples are selected based on exceeding a confidence threshold for the classification decision, and where the synthetic samples each include the token.
710

Retrain the machine learning model using the synthetic samples.
720

*Fig. 7*

TRAINING DATA AUGMENTATION FOR MACHINE LEARNING

BACKGROUND

Technical Field

This disclosure relates generally to data processing, and, more specifically, to techniques for classifying various data, e.g., using machine learning techniques.

Description of the Related Art

As larger amounts of data (often referred to as "big data") become available to various systems, classification of this data for various uses such as data analysis for detection of suspicious behavior becomes desirable. Classification of data is often performed using either rules-based or machine learning techniques. Rules-based techniques often include manually generating lists of rules that are applied to data, while machine learning techniques attempt to generate predictions for new data based on known classifications for prior data. In some situations, both techniques are used in combination.

BRIEF DESCRIPTION OF THE DRAWINGS

FIG. 2A is a block diagram illustrating example existing samples, according to some embodiments.

FIG. 2B is a block diagram illustrating an example reduced-feature set of existing samples, according to some embodiments.

FIG. 2C is a block diagram illustrating example classifications for the reduced-feature set of existing samples, according to some embodiments.

FIG. 2D is a block diagram illustrating example synthetic training samples, according to some embodiments.

FIG. 5 is a flow diagram illustrating a method for generating synthetic samples from a rule and a set of existing samples, according to some embodiments.

FIG. 6 is a flow diagram illustrating a method for generating an augmented set of samples and retraining a trained machine learning model using the augmented set of samples, according to some embodiments.

FIG. 7 is a flow diagram illustrating a method for generating synthetic samples from a token and a set of existing samples, according to some embodiments.

DETAILED DESCRIPTION

Figure 1:
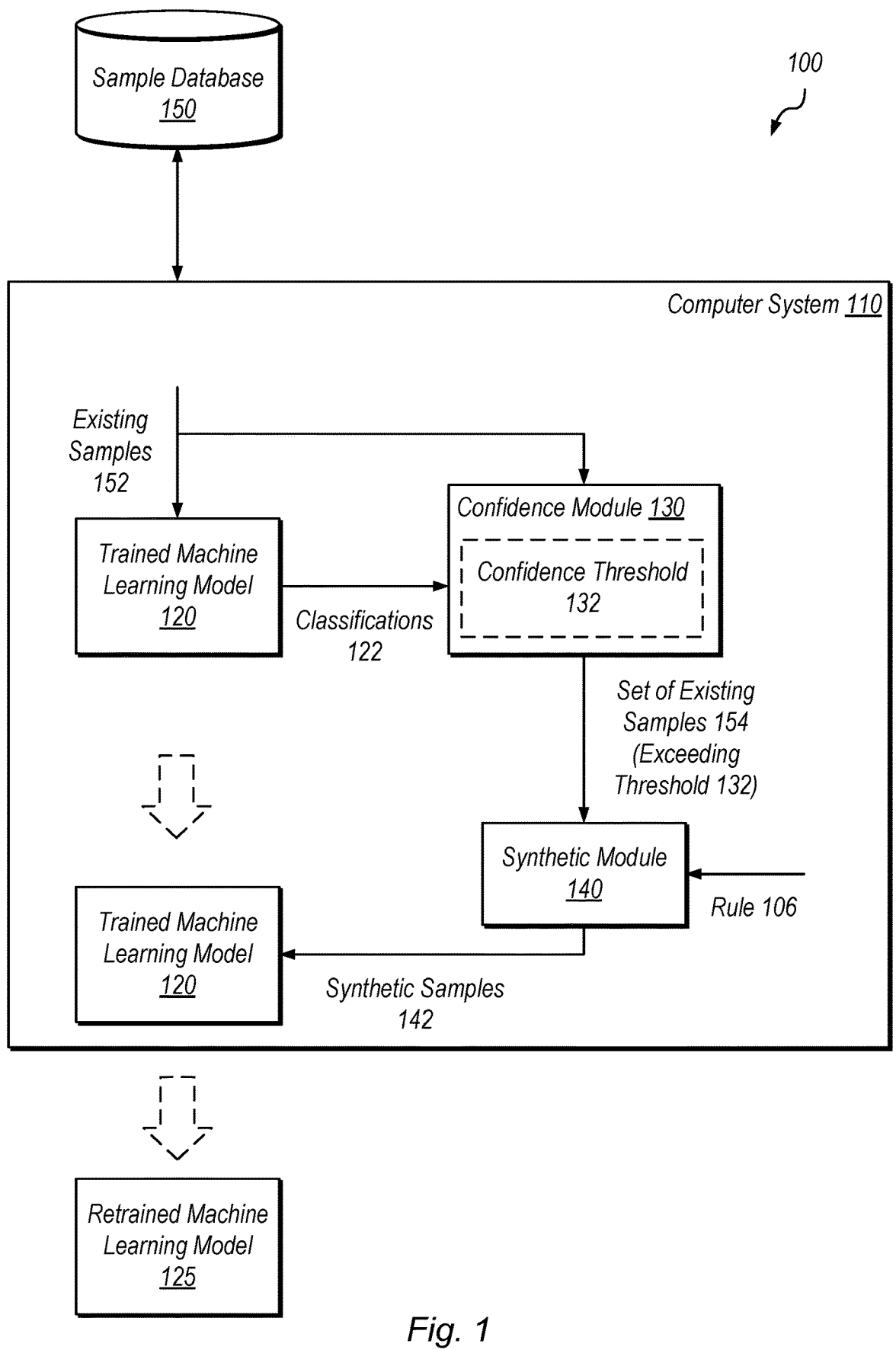
FIG. 1 is a block diagram illustrating an example computer system configured to retrain a trained machine learning model using synthetic samples, according to some embodiments.

Machine learning models are commonly trained on new real-world data, as this data and associated labels become available. In this process, these models may develop biases. For example, a computer vision model may learn over time that images with a particular pixel in a particular location should always be classified as containing a dog. In this example, however, if an image of a cat that happens to include the particular pixel in the particular location is input into the computer vision model, the model would incorrectly classify this image as containing a dog. Knowledge of the effect of this pixel on the model's decision-making process may be exploited in some cases by individuals seeking to cause an incorrect classification.

In order to overcome biases that may develop in machine learning models over time, the disclosed techniques include generating synthetic training examples for tightening a decision boundary of a machine learning model. For example, if a decision boundary for a particular feature is a range of values between 100 and 200, then it might be difficult to determine a label for an example that includes a value for this feature that falls within this range. The disclosed techniques attempt to tighten the decision boundary for this particular feature to a range of values between 150 and 160. As used herein, the term "decision boundary" is intended to be construed according to its well-understood meaning, which includes a region of a problem space in which classifications output by a machine learning classifier are vague. For example, labels may not be readily apparent for examples whose classifications fall within a decision boundary of a machine learning model. The disclosed techniques attempt to shrink the size of decision boundaries for a machine learning model.

In disclosed techniques, the synthetic training samples are generated by removing a known biased feature from an initial set of training samples to produce a reduced-feature set and generating, using a machine learning model, classifications for training samples in this reduced-feature set. As used herein, the term "feature" is intended to be construed according to its well-understood meaning in the context of machine learning, which includes an individual characteristic of a portion of data that is used as an example in training a machine learning model. Each example used to train a machine learning model may include a feature vector (e.g., a set of features associated with an example). Based on the output classification scores for examples in this set, the disclosed system selects a small set of high-confidence training examples. Training examples whose classification scores are far from a decision boundary are considered high-confidence examples.

In the context of binary classification, on a scale of 0 to 1 (with 0 being one label and 1 being another) a classification score of 0.9 would be far from the decision boundary that ranges from 0.4 to 0.6 and, therefore, this example would be a high-confidence training example. The disclosed system then inserts values of a particular biased feature into the selected small set of high confidence examples. For example, a website with a URL that includes the term "explosives," may be known to produce biased output from a trained machine learning model. The training examples with the inserted biased feature, along with the initial set of training examples, are then used to retrain a machine learning model such that it no longer produces biased classifications.

Prediction systems that rely solely on machine learning models for classifying data may miss out on "red flag" features that are included in this data. Red flag features may be ones that a system administrator would recognize as being associated with a particular label. A machine learning-based prediction system, however, may not recognize these features, particularly in situations in which a small set of training examples that includes this red flag feature are available (e.g., only five out of 10,000 training examples include the red flag feature). For example, in the context of a loan approval processing system, a red flag feature might be the age of individuals applying for loans. For example, in the majority of prediction systems, it may be desirable for the model to reject loan applications associated with applicants under the age of 18. In this example, the prediction system may include an explicit rule specifying that applications submitted from users under the age of 18 are to be automatically rejected, while a machine learning model is used to make decisions for all other applications.

In some situations, however, a particular rule may be difficult to explicitly define. Consider a situation in which an individual applies to sell weapons via an online website. In this situation, it might desirable for a machine learning model to provide a classification score indicating that this website application should be denied based on sales of this type of content being prohibited online, for example. Instead of including an explicit rule specifying "if a uniform resource locator (URL) includes the term 'explosion,' then classify this URL as prohibited," the disclosed techniques train a machine learning model to more generally understand that "websites including the term explosion may be prohibited." For example, in some situations, a website may include blog content discussing fireworks (and by extension explosions). In this particular situation, it might be undesirable for the machine learning model to classify this website as prohibited. If, however, a website offers explosives for sale, it may be desirable for the predication system to classify this website as prohibited.

In order to account for certain rules without including explicit rules in a prediction system, machine learning models may be trained using synthetic training examples generated using similar techniques to those discussed above with reference to machine learning bias. In particular, the disclosed techniques include determining an explicit rule, such as "explosives are prohibited." The disclosed system then selects a subset of training samples, from an initial set of training examples used to train a machine learning model, that do not comply with this explicit rule. This subset of non-compliant examples is then utilized to generate a synthetic set of training samples in a similar manner to generating synthetic samples from a biased feature (also referred to herein as a factor) and existing training samples. The disclosed system uses these synthetic training samples in combination with an initial set of training samples to retrain a trained machine learning model. Such techniques provide for incorporating knowledge of customized binary rules into a trained machine learning model used to classify data without explicitly including such rules in a prediction system.

The disclosed techniques may advantageously provide more accurate machine learning classifiers relative to classifiers trained using traditional techniques. In addition, the disclosed techniques may reduce the amount of bias developed by machine learning models over time, by providing artificial training examples to counteract training examples causing such bias. This may in turn may allow various systems using machine learning classifiers trained using the disclosed techniques to provide better security. As one particular example, a computer security system configured to detect suspicious behavior on a given server may become more accurate in classifying various activity as suspicious or not. Further, the disclosed techniques may prevent individuals from exploiting known biases in machine learning models, e.g., to affect how these models classify certain content.

Example Synthetic Sample Generation

FIG. 1 is a block diagram illustrating an example computer system configured to retrain a trained machine learning model using synthetic samples. In the illustrated embodiment, system 100 includes sample database 150, retrained machine learning model 125, and computer system 110, which in turn includes trained machine learning model 120, confidence module 130, and synthetic module 140. As used herein, the term "synthetic sample" refers to a labeled example that is artificially generated for use in training a machine learning model—thus, a synthetic sample does not appear in the initial training data, but rather is generated using information in the initial training data. A synthetic sample may be generated by combining features from existing training examples with known labels. Generating a synthetic sample may be as simple as assigning a new value to a particular feature of an existing training example.

Computer system 110, in the illustrated embodiment, accesses sample database 150 to retrieve various samples for training machine learning models. Computer system 110 may be a system configured to train various machine learning models for a service such as PAYPAL that processes online transactions between its clients. Sample database 150 may store a plethora of training samples collected by a service over time. Database 150 may be any of various types of databases including relational and non-relational databases configured to store both training samples as well as their corresponding labels. The existing samples 152 retrieved by computer system 110 from database 150 may be training examples (with multiple features) for which labels are known.

In the context of transaction processing services such as PAYPAL, a machine learning model used by such services may be trained using transactions that are known to be fraudulent (i.e., are labeled as fraudulent) such that these models are able to accurately classify future fraudulent transactions during processing of these transactions, for example. In various situations, such services may wish to implement rules during transaction processing in order to avoid compliance issues. For example, in the PAYPAL context, certain sales (e.g., of illegal products) may be prohibited. In some cases, however, implementation of explicit rules during security evaluation (of clients) by these services may be too rigid. In order to train a machine learning model to have knowledge of a rule without training this model to explicitly follow this rule, the disclosed techniques generate synthetic training samples from this rule and existing samples. That is, the disclosed techniques translate rules in such a way that machine learning models are able to learn about the rule without exclusively applying the rule in various scenarios.

Similar techniques may be used to remove or reduce bias in trained machine learning models. Over time, machine learning models may develop a bias relative to a particular feature based on lots of existing training samples including a given value for this feature having a certain label. The example illustrated in FIG. 3 shows biased classifications for existing samples having a particular pixel value at a particular location. The disclosed techniques synthesize positive samples of under-represented datapoints in problematic features to be used in retraining a model. For example, the disclosed techniques attempt to retrain a machine learning model such that it does not classify various data based on personally identifiable information (PII) related to this data. As one specific example, synthesized samples are used retrain a model such that it does not classify employment applications according to their generation (e.g., baby boomer, generation X, millennial, generation Z, etc.). That is, the disclosed techniques attempt to prevent a machine learning model from rejecting applicants in generation Z based on prior applications from individuals in this age group being inexperienced. For example, applicants in this younger age group may still possess the appropriate qualifications, but over time the machine learning model may learn to automatically reject such applicants based on their generation (e.g., determined from an age feature). This example is discussed in further detail below with respect to FIGS. 2A-2E.

In the illustrated embodiment, computer system 110 inputs existing samples 152 into machine learning model 120 to generate classifications 122. In some embodiments, machine learning model 120 is a trained machine learning model that was trained previously (either by computer system 110 or another system) using a plurality of existing samples retrieved from sample database 150. Prior to inputting these existing samples 152 into model 120, computer system 110 removes a particular feature that does not comply with a rule 106. For example, this hard-coded rule 106 may specify that the online sale of an item whose value is over 50,000 US dollars is prohibited. In this example, computer system 110 removes a dollar value feature from various transaction examples prior to inserting these samples into model 120. Machine learning model 120 may be any of various types of machine learning models, including: classifiers, neural networks, regression models, decision trees, random forests, support vector machines, Naïve Bayes models, clustering models, etc. These models may be trained using any of various training methods, including supervised and unsupervised methods. In addition, training samples used to train machine learning models may be weighted using any of various weighting techniques, as discussed below with reference to FIG. 4.

Confidence module 130, in the illustrated embodiment, receives existing samples 152 and classifications 122 and determines whether the classifications exceed a confidence threshold 132. Output of machine learning models may be referred to herein as classification decisions or classification scores. In some embodiments, confidence threshold 132 is determined based on a decision boundary of the trained machine learning model. If a decision boundary includes scores between 0.4 and 0.6, classification scores that are at least 0.2 outside of this boundary may exceed the confidence threshold. For example, if a classification score output by model 120 for a particular existing sample is 0.85, then this classification score exceeds the confidence threshold (e.g., 0.85 is 0.25 greater than 0.6). Similarly, a classification score of 0.2 for an existing sample would also exceed the confidence threshold 132 (i.e., 0.2 is 0.2 less than 0.4). Confidence module 130, in the illustrated embodiments, identifies existing samples whose classifications exceed the confidence threshold 132. These samples are selected by module 130 for use in generating synthetic samples in disclosed embodiments.

Synthetic module 140, in the illustrated embodiment, receives a set of existing samples 154 whose classifications exceed confidence threshold 132 from confidence module 130. Samples included in the set of existing samples 154 may be referred to herein as high-confidence training samples. These samples 154 are a set of samples included in the existing samples 152. As such, the set of existing samples 154 do not include the particular feature due to it being removed by computer system 110 as discussed above. Synthetic module 140 is then operable to generate synthetic samples 142 from rule 106 and set of existing samples 154. For example, synthetic module 140 generates copies of samples 154 and inserts the values of the particular feature removed by computer system 110 from existing samples 152 into these copies. That is, synthetic module 140 inserts the values that did not comply with rule 106 into copies of the identified high confidence training samples to generate synthetic samples 142. In some embodiments, computer system 110 inserts a value specified in rule 106. For example, if rule 106 specifies that URLs cannot include the term "explosives," then this term will be inserted as a value in the URL feature of the copies.

Then, synthetic module 140 assigns a negative label to these synthetic samples. In this way, the disclosed techniques are signaling to the machine learning model that various samples with a value for the particular feature that do not comply with the rule 106 should likely be classified as "negative" (e.g., not complying with the rule 160) without explicitly instructing the model to exclusively follow this rule 106. Said another way, the label is set as negative in order to teach the model that these types of samples are undesirable (or even prohibited) without introducing an explicit rule specifying to reject similar data in the future. Generating synthetic examples from a rule and existing samples is discussed in further detail below with reference to FIG. 5.

Computer system 110, in the illustrated embodiment, retrains trained machine learning model 120 using synthetic samples 142 generated by synthetic module 140. For example, computer system 110 may input synthetic samples 142, which include labels, into trained machine learning model 120 and observe this model's output. Computer system 110 may adjust various weights of this model 120 based on comparing the observed output with the labels included in synthetic samples 142. Once the output of model 120 for these synthetic samples is satisfactory, system 110 outputs retrained machine learning model 125. This retrained model may be used by various services to classify data using its new knowledge of rule 106. As discuss in detail below with reference to FIG. 4, in some embodiments, computer system 110 weights synthetic samples 142 prior to retraining trained machine learning model 120.

In some embodiments, computer system 110 generates synthetic samples from a token and a set of existing samples. Generation of synthetic samples from a token may be performed by computer system 110 in addition to generation of such samples from a rule. For example, computer system 110 may generate two different sets of synthetic training samples using a token (e.g., a feature associated with bias) and a rule, respectively. Computer system 110 may then retrain trained machine learning model 120 using both of these sets of synthetic samples. Example generation of synthetic samples from a token is discussed in further detail below with reference to FIGS. 2A-2E.

The disclosed techniques may advantageously produce a machine learning model that is more robust than machine learning models trained using traditional techniques. For example, a model trained using both sets of synthetic samples will not only be unbiased (for a given feature), but also be able to discern when a rule should be applied without exclusively applying this rule when determining classifications. For example, such a model may still make classifications which oppose this rule. In addition, machine learning models trained using the disclosed techniques may improve the security of various data processing systems implementing these models by increasing the accuracy of such systems in classifying data (e.g., detecting inappropriate websites).

As such, these systems will be able to make informed and accurate decisions when processing data based on these classifications. As one specific example, PAYPAL will more accurately be able to distinguish between transaction requests from inappropriate websites and transaction requests from compliant websites.

Note that various examples herein discuss classification of transactions on a scale of 0 to 1 but these examples are discussed for purposes of explanation and are not intended to limit the scope of the present disclosure. In other embodiments, classifications may be non-binary (e.g., five different types of classifications may be output by a machine learning classifier). In addition, although machine learning classifiers are discussed herein, the disclosed techniques may be applied to various other types of machine learning models. Further, any of various types of information, other than transactions, may be classified using the disclosed techniques.

In this disclosure, various "modules" operable to perform designated functions are shown in the figures and described in detail above (e.g., confidence module 130, synthetic module 140, weighting module 362, etc.). As used herein, a "module" refers to software or hardware that is operable to perform a specified set of operations. A module may refer to a set of software instructions that are executable by a computer system to perform the set of operations. A module may also refer to hardware that is configured to perform the set of operations. A hardware module may constitute general-purpose hardware as well as a non-transitory computer-readable medium that stores program instructions, or specialized hardware such as a customized ASIC. Accordingly, a module that is described as being "executable" to perform operations refers to a software module, while a module that is described as being "configured" to perform operations refers to a hardware module. A module that is described as "operable" to perform operations refers to a software module, a hardware module, or some combination thereof. Further, for any discussion herein that refers to a module that is "executable" to perform certain operations, it is to be understood that those operations may be implemented, in other embodiments, by a hardware module "configured" to perform the operations, and vice versa.

Example Biased Feature

The example discussed below with reference to FIGS. 2A-2B pertains to generation of synthetic samples based on a potentially (or known) biased feature. In particular, this example discusses classification of job applications from various applicants based on information provided in their respective resumes (e.g., name, age, occupation, etc.). Further, in this particular example, the known biased feature is an age 204 feature. For example, a machine learning classifier may be biased regarding this feature, such that it classifies resumes of young individuals as "rejected." Said another way, over time, this machine learning classifier may determine a correlation between the age feature and unqualified applicants and, therefore, begins to classify young applicants as unqualified ("rejected"). The disclosed techniques attempt to remove such a bias by generating synthetic samples and retraining this machine learning model using the synthetic samples. Note that this example is included for purposes of illustration and is not intended to limit the scope of the present disclosure.

FIG. 2A is a block diagram illustrating example existing samples. In the illustrated embodiment, a table 200A of existing samples is shown with the following features 212: name 202, age 204, address 206, and occupation 208. In addition to displaying values for features 212, table 200A includes labels 210 for each sample. The values of label 210 for each row of table 200A indicate whether the respective individuals are qualified for a job position. For example, a zero indicates that this individual is not qualified for a job, while a one indicates that this individual is qualified.

The values of features 212 for each row in table 200A indicate information about individuals collected from their resumes, for example. As one specific example, the first row of table 200A includes an existing sample for Erika, age 24, living at 222 Erika Ave. Erika's resume indicates that she has experience as a social worker. The label 210 values for Erika and John indicate that these individuals are not qualified for a job position, while the label 210 values for Jane and John indicate that these individuals are indeed qualified. Note that the labels shown in FIG. 2A were assigned based on classifications generated by a biased machine learning model. Specifically, this machine learning model makes biased classifications based on the age 204 feature. For example, this biased machine learning model automatically classifies young individuals (e.g., ages 24 and 21) as unqualified based on their age. This biased classification may be incorrect, particularly in situations in which individuals have multiple years of experience in their occupation even if they are young. For example, even though Erika is only 24 years old, she has more than four years of experience as a social worker and, therefore, may be sufficiently qualified for a job position to which she has applied.

The existing samples shown in table 200A may be retrieved from a repository of various different labeled existing samples. That is, for purposes of illustration, only four existing samples are shown in FIG. 2A; however, any number of existing samples may be used to generate synthetic samples.

FIG. 2B is a block diagram illustrating an example reduced-feature set of existing samples. In the illustrated embodiment, a table 200B of existing samples with the age 204 feature removed are shown. As discussed above with reference to FIG. 2A, the age feature has been determined (e.g., by a system administrator) to be causing a machine learning model to produce biased classifications. In order to generate synthetic samples for retraining the biased model, computer system 110 removes the age feature from four existing samples due to this feature being associated with bias. Features associated with bias may be referred to herein as "tokens." The set of existing samples shown in FIG. 2B may be referred to as a reduced-feature set.

FIG. 2C is a block diagram illustrating example classifications for the reduced-feature set of existing samples. In the illustrated embodiment, a table 200C of a reduced-feature set of existing samples is shown with classification scores 220 for each sample included in the set. In addition, a set 252 of existing samples (e.g., the sample in row two and the sample in row four) whose classification scores exceed a confidence threshold 132 is shown in FIG. 2C. Consider an example with a confidence threshold of 0.7. In this example, the classification scores 0.85 and 0.9 exceed the confidence threshold of 0.7 and, therefore, the existing samples corresponding to the classification scores are selected for the set 252 of existing samples. This set 252 of two existing samples are considered high-confidence samples and thus are used to generate synthetic samples.

FIG. 2D is a block diagram illustrating example synthetic training samples. In the illustrated embodiment, a table 200D of two synthetic training samples is shown. The two synthetic training samples are copies 254 of the two existing samples shown in table 200C whose classification scores exceed confidence threshold 132. These two copies include the age 204 values from two of the existing samples (i.e., the samples in row 1 and row 3) in table 200A. That is, computer system 110 inserts the age values of Erika and John into the two copies 254 of the existing samples included in set 252 (i.e., the high-confidence existing examples) to generate two synthetic samples. In the illustrated embodiment, the two synthetic samples have labels of 1 due to computer system 110 assigning a positive label to these synthetic samples in order to help machine learning models learn a pattern of positively classifying resumes for young individuals (e.g., applicants aged between 20-25).

Figure 2E:
FIG. 2E is a block diagram illustrating an example augmented set of training samples, according to some embodiments.
Figure 3:
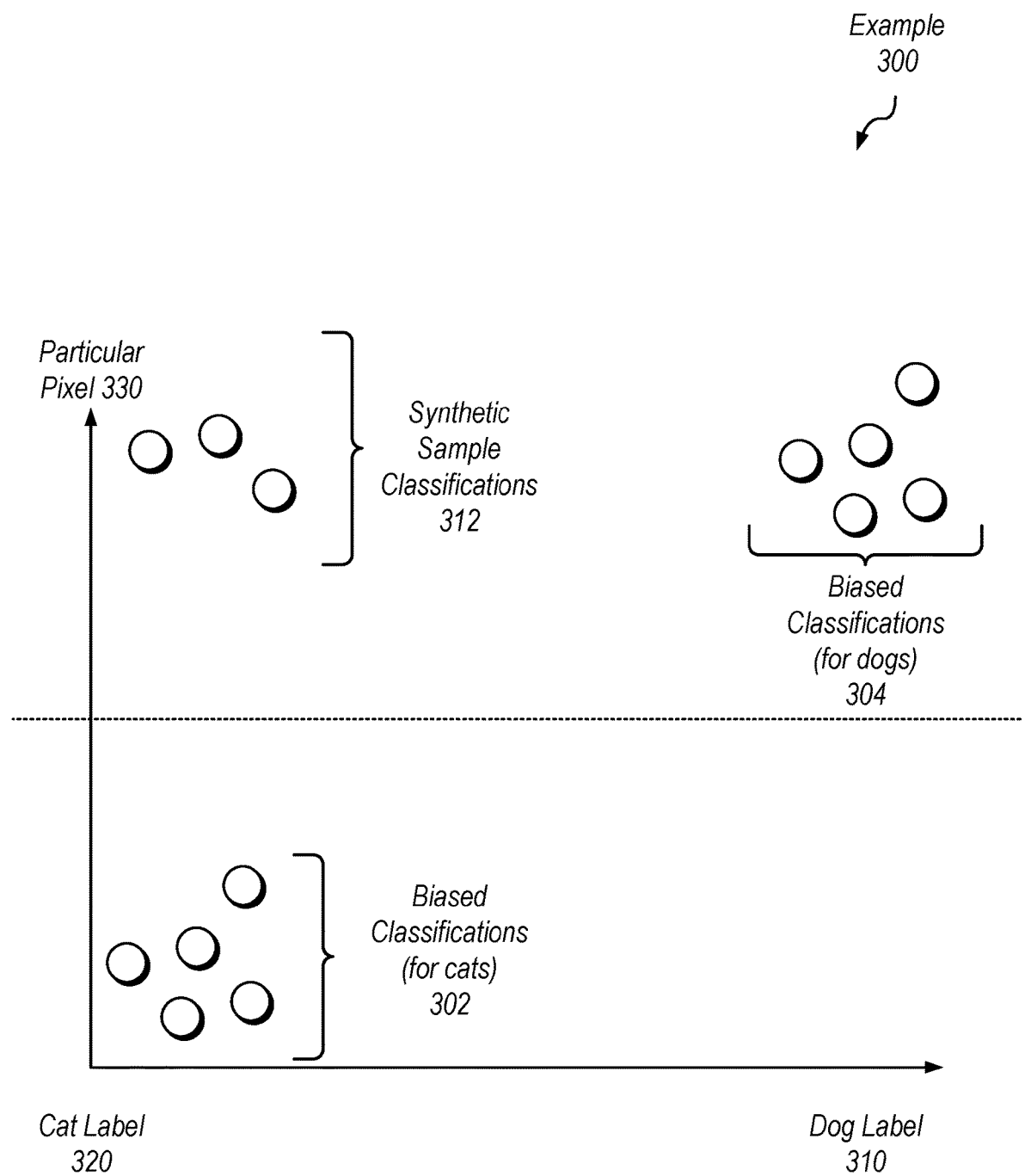
FIG. 3 is a diagram illustrating classifications for both synthetic samples and existing samples, according to some embodiments.

FIG. 2E is a block diagram illustrating an example augmented set of training samples. In the illustrated embodiment, a table 200E of an augmented set of training samples is shown. This augmented set includes both existing samples and synthetic samples 212. While both the existing samples and the synthetic samples are used to retrain a biased machine learning model, the synthetic samples 214 are weighted more heavily than the existing samples. As such, these synthetic samples have a greater impact on the retraining of the biased model than the existing samples. In FIG. 2E, in addition to the features 212, table 200E includes a weight column with weight values assigned to each training sample included in the augmented set. In the illustrated embodiment, the weight values for the synthetic samples 212 are twice the weight values for the existing samples included in table 200E (i.e., the first four rows of this table). In this way, the synthetic samples 214 have a greater impact on the model during retraining than the existing samples (e.g., the samples in rows 1 and 3 of table 200E).

Computer system 110 may determine these weights based on various different factors. In some embodiments, the weights are determined based on the total number of existing samples included in the augmented set of samples. For example, weights may be determined based on a ratio of existing samples to synthetic samples included in an augmented set of samples. In the example shown in FIG. 2E, there are four existing samples and two synthetic samples, meaning that the weights for the synthetic samples are four divided by two (i.e., weight=2). In general, computer system 110 weights synthetic samples 214 higher than existing samples. In the example of FIG. 2E, this weighting scheme is due to the small number of synthetic samples available. Weighting schemes are discussed in further detail below with reference to FIG. 4. In some embodiments, computer system 110 trains a machine learning model using the augmented set of training samples.

Turning now to FIG. 3, an example 300 is shown illustrating classifications for existing samples and synthetic samples. The existing samples include values for a feature associated with bias. For example, a biased machine learning model outputs classification scores for images that include the particular pixel 330. These classification scores indicate that this image depicts a dog. Specifically, the machine learning model has learned over time to associate images having a particular pixel value at a particular location within the image with images of dogs. Therefore, based on an image having the particular pixel value at the particular location, the machine learning model concludes that this image depicts a dog. Similarly, if an image does not include this pixel value at the particular location, the model may classify this image as depicting a cat.

Using the disclosed techniques, synthetic samples are generated from the existing samples (images associated with classifications 302). For example, copies of the images depicting cats are generated and these copies are altered such that they include the particular pixel in the particular location. These images are then assigned a cat label 320 and are weighted more heavily than the existing images depicting cats and dogs for which biased classifications 302 and 304 are shown. These copied images with the inserted particular pixel (which the model currently believes indicate that the image includes a dog) are then fed into the machine learning model for retraining. FIG. 3 shows synthetic sample classifications 312 generated by a retrained machine learning model for these copied images that include the particular pixel 330. These synthetic samples that are used to retrain the machine learning model assist in reducing or removing bias. In this example, the retrained model no longer exclusively classifies images including the particular pixel value at the particular location as depicting a dog. As shown in FIG. 3, instead of always classifying images with the particular pixel as depicting dogs, the retrained model generates classifications 312 for some images with the particular pixel specifying that these images depict cats.

Example Weighting

Figure 4:
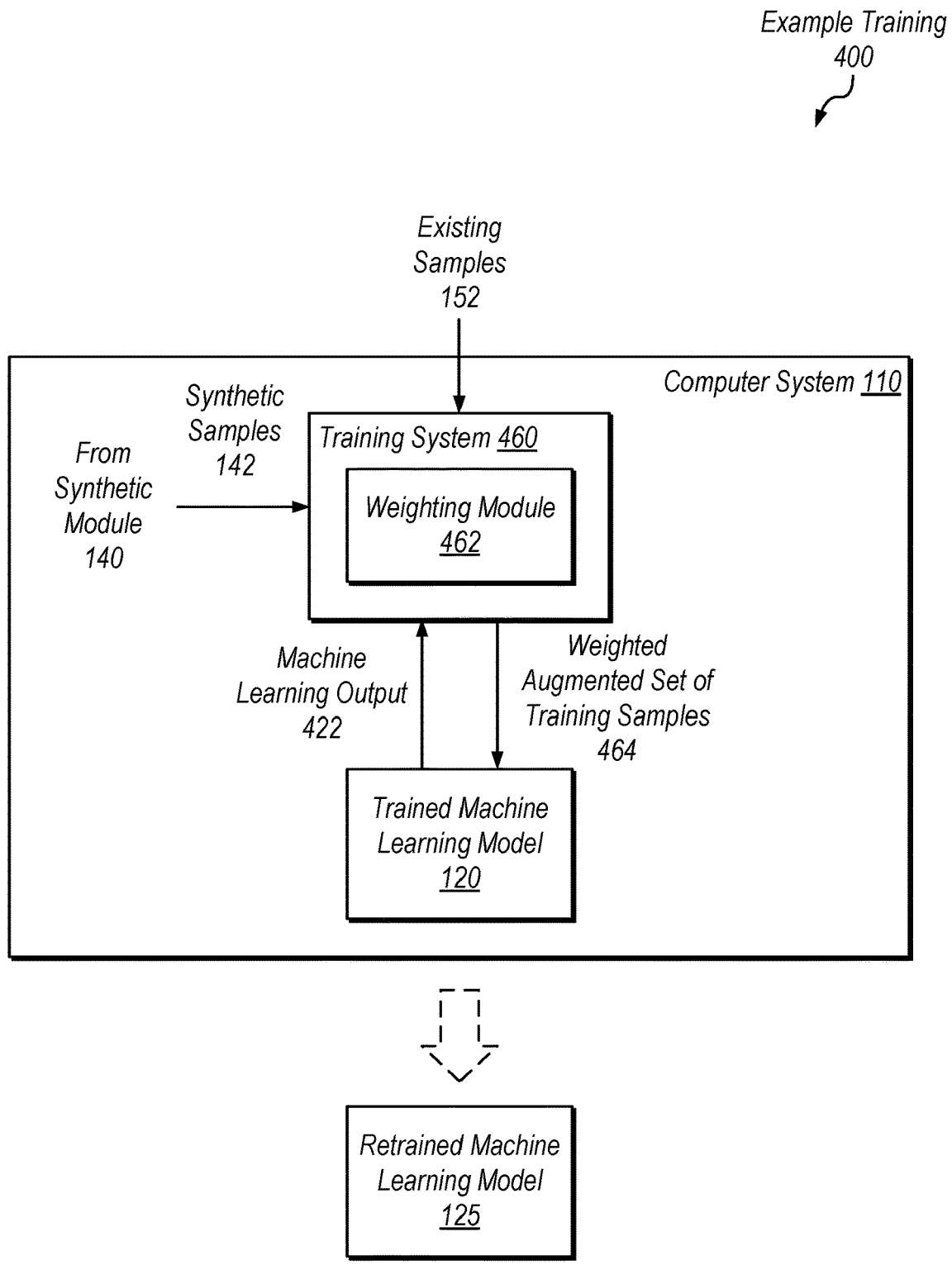
FIG. 4 is a block diagram illustrating an example weighting module, according to some embodiments.

FIG. 4 is a block diagram illustrating an example weighting module. In the illustrated embodiment, example 400 shows example training of a trained machine learning model 120 performed by computer system 110 using a training system 460.

Training system 460, in the illustrated embodiment, retrieves one or more existing samples 152 from sample database 150 and receives synthetic samples 142 from synthetic module 140. Training system 460 inputs a total number of existing samples 152 and a total number of synthetic samples 142 into weighting module 462. This module 462 then generates weights for both types of samples (both the existing samples and the synthetic samples). As discussed above with reference to FIG. 2E, in some embodiments, weighting module 462 determines weights by dividing a total number of existing training samples by a total number of synthetic samples. In other embodiments, module 462 determines weights based on a total number of samples included in an augmented set of examples by a total number of synthetic examples. In still other embodiments, the weights output by weighting module 462 may be randomly selected for at least a first round of training performed by training system 460 for trained machine learning model 120. In some embodiments, weighting module 462 weights synthetic samples more heavily that existing samples. For example, module 462 may weight synthetic examples twice as heavily as existing samples.

Training system 460 assigns weights output by weighting module 462 to the existing samples 152 and synthetic samples 142 to generate a weighted, augmented set 464 of training samples. Training system 460 then inputs this set 464 of training samples into trained machine learning model 120. Based on machine learning output 422, training system 460 uses weighting module 462 to generate new weights for one or more of the training samples included in set 464. Training system 460 then inputs set 464 of training samples with updated weights into model 120 for further training. This process may be repeated until training system 460 is satisfied with the machine learning output 422 of model 120. At this point, computer system 110 outputs a retrained machine learning model 125 usable to classify data for various services (e.g., PAYPAL transactions).

Example Methods

FIG. 5 is a flow diagram illustrating a method for generating synthetic samples from a rule and a set of existing samples, according to some embodiments. The method shown in FIG. 5 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, computer system 110 performs the elements of method 500.

At 510, in the illustrated embodiment, a computer system generates synthetic samples for a trained machine learning model usable to make a classification decision, where the synthetic samples are generated from a rule and a set of existing samples, and where the set of existing samples are selected based on exceeding a confidence threshold for the classification decision. In some embodiments, the confidence threshold for the classification decision is determined based on a decision boundary of the trained machine learning model. The set of existing samples are selected from a plurality of existing samples stored in sample database 150, for example. These existing samples are samples for which labels are known and may have been used prior to generating synthetic samples to train various machine learning models.

In some embodiments, the synthetic samples are generated by creating copies of samples in the set of existing samples. In some embodiments, the synthetic samples are generated by replacing values in a particular feature of the copied samples with a value specified in the rule. In some embodiments, the synthetic examples are further generated by assigning a negative label to the synthetic samples. In some embodiments, the rule specifies that a first class of samples have a lower threshold for a positive classification label than a second class of samples, where the set of existing samples are selected based on having a classification score that is lower than a standard classification score threshold. In some embodiments, the synthetic samples are generated to include one or more features associated with the first class of samples, where the first class of samples includes a set of favored accounts, and where the second class of samples includes a set of non-favored accounts.

At 520, the computer system retrains the trained machine learning model using the synthetic samples. In some embodiments, the retraining includes weighting the synthetic samples based on a total number of generated synthetic samples, where the synthetic samples are weighted more heavily than the set of existing samples. In some embodiments, the retraining is further performed using both the synthetic samples and existing samples from which the set of existing samples were selected.

Consider a situation in which a transaction processing system wishes to process transaction requests from premium user accounts differently than non-premium user accounts. That is, this system may wish to "bend the rules" for these premium accounts. In this situation, it is desirable for a machine learning model to view transaction requests from these premium user accounts as favored data. In order to process transaction request from premium accounts differently, a machine learning model is trained from synthetic samples generated using the disclosed techniques. These synthetic samples are generated from a rule that specifies names of accounts for which transaction requests are to be approved by the model even in situations in which the transaction requests have classification scores below a traditional classification score threshold. Said another way, transaction requests from these premium accounts may be approved by a retrained model even in situations in which these transactions would not have been approved by the model prior to retraining with the synthetic samples.

In some embodiments, a set of existing samples used to generate these synthetic samples for the premium accounts have classification scores that are lower than a standard classification score threshold. In addition, these synthetic samples are generated using features associated with the premium accounts. In this way, a machine learning model that is retrained using these synthetic samples will learn to associate a lower classification threshold with one or more premium accounts. In this way, premium accounts will be evaluated according to a lower classification threshold than non-premium accounts. As such, if transaction requests from a premium and a non-premium account are assigned similar classification scores by the retrained model, the transaction processing system would approve the premium account request (based on this request satisfying the lower classification threshold) and deny the non-premium account request (based on this request failing to satisfy a higher classification threshold). That is, even if a transaction request from a premium account gets assigned a low classification score (e.g., 0.2) corresponding to a negative or "disapprove" label, a model trained according to the synthetic samples generated from premium account features will approve this premium account's request.

FIG. 6 is a flow diagram illustrating a method for generating an augmented set of samples and retraining a trained machine learning model using the augmented set of samples, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, computer system 110 performs the elements of method 600.

At 610, in the illustrated embodiment, a computer system generates, from an initial set of samples used to train a machine learning model, an augmented set of samples. In some embodiments, generating the augmented set of samples further includes assigning a positive classification label to the synthetic samples. In some embodiments, the initial set of samples is the same as existing samples retrieved from sample database 150. For example, the set of existing samples selected at element 510 may be selected from the set of initial samples based on one or more of these initial samples having classification scores exceeding a confidence threshold.

At 620, the computer system removes a particular feature from one or more of the initial set of samples to generate a reduced-feature set of training samples. In some embodiments, the particular feature is associated with bias. For example, training samples with values for the particular feature may be causing machine learning models trained using these samples to develop a tendency to classify future data having this same value for the particular feature in a certain manner. This bias that develops over time may be undesirable to various systems employing these machine learning models.

At 630, the computer system determines classification scores for samples in the reduced-feature set of samples. These classification scores may be on a scale from 0 to 1, 0 to 100, 0 to 1000, etc. In some embodiments, the computer system uses a trained machine learning classifier to determine the classification scores. This trained machine learning classifier may be trained using training samples that generated based on prior data for which labels are known. For example, this classifier may be trained using the initial set of samples. In some embodiments, the trained machine learning classifier is a non-binary classifier. For example, this classifier may classify various data according to a plurality of different classification (instead of based on two possible classification scores).

At 640, the computer system selects a group of the reduced-feature set of samples that meet a confidence threshold. In some embodiments, the confidence threshold specifies a threshold difference between a decision boundary of the trained machine learning model and classification scores. This group of samples is a subset of the reduced-feature set of samples.

At 650, the computer system generates synthetic samples by reinserting the particular feature into samples in the selected group. In some embodiments, reinserting the particular feature into samples in the selected group is performed based on a value specified in a rule. In other embodiments, reinserting the particular feature into samples of the selected group is performed based on a token. In some embodiments, the token corresponds to characteristics of data being classified by the trained machine learning model that are associated with bias. In some embodiments, the retraining reduces bias of the machine learning model.

At 660, the computer system adds the synthetic samples to the initial set of samples to generate the augmented set of samples. This augmented set of samples includes weights assigned to respective samples within the set based on the weighting performed by the computer system.

At 670, the computer system retrains the trained machine learning model using the augmented set of samples. In some embodiments, the retraining includes determining, based on a ratio of a total number of samples included in the augmented set to a total number of synthetic samples, weight values for the synthetic samples. In some embodiments, the retraining further includes weighting the synthetic samples based on the determined weight values. In some embodiments, weight values for the synthetic samples are greater than weight values for the set of existing samples.

FIG. 7 is a flow diagram illustrating a method for generating synthetic samples from a token and a set of existing samples, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In some embodiments, computer system 110 performs the elements of method 700.

At 710, in the illustrated embodiment, a computer system generates synthetic samples for a machine learning model trained to make a classification decision based on existing samples, where the synthetic samples are generated from a token and a set of the existing samples. In some embodiments, the set of the existing samples are selected based on exceeding a confidence threshold for the classification decision, where the synthetic samples each include the token.

In some embodiments, the token corresponds to a portion of a name feature. In some embodiments, the machine learning model is trained without using an entirety of the name feature, where the synthetic samples each include the token. In some embodiments, the portion of the name feature is used to retrain the machine learning model. For example, the portion of the name feature may be the prefix "Dr." In some embodiments, it is desirable to retrain a trained machine learning model to generate classifications differently based on an individual's name including the prefix "Dr." For example, this individual may be more qualified than another individual for a job position in the medical field based on their name including the prefix "Dr."

At 720, the computer system retrains the machine learning model using the synthetic samples. In some embodiments, the retrained model reduces bias based on the token, where the token corresponds to personally identifiable information (PII). In some embodiments, the retraining is further performed using the existing samples. In some embodiments, synthetic samples are weighted more heavily than the existing samples in retraining the machine learning model.

Example Computing Device

Figure 8:
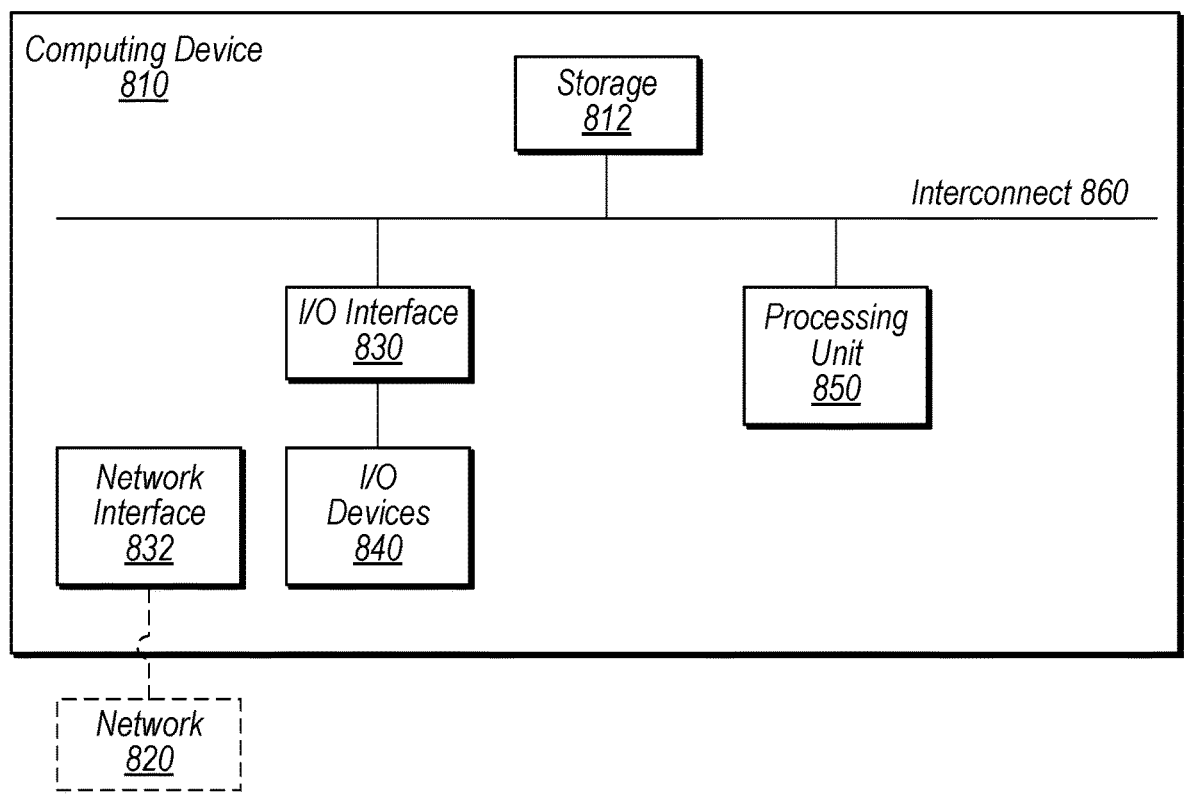
FIG. 8 is a block diagram illustrating an example computing device, according to some embodiments.

Turning now to FIG. 8, a block diagram of one embodiment of computing device (which may also be referred to as a computing system) 810 is depicted. Computing device 810 may be used to implement various portions of this disclosure. Computing device 810 may be any suitable type of device, including, but not limited to, a personal computer system, desktop computer, laptop or notebook computer, mainframe computer system, web server, workstation, or network computer. As shown, computing device 810 includes processing unit 850, storage 812, and input/output (I/O) interface 830 coupled via an interconnect 860 (e.g., a system bus). I/O interface 830 may be coupled to one or more I/O devices 840. Computing device 810 further includes network interface 832, which may be coupled to network 820 for communications with, for example, other computing devices.

In various embodiments, processing unit 850 includes one or more processors. In some embodiments, processing unit 850 includes one or more coprocessor units. In some embodiments, multiple instances of processing unit 850 may be coupled to interconnect 860. Processing unit 850 (or each processor within 850) may contain a cache or other form of on-board memory. In some embodiments, processing unit 850 may be implemented as a general-purpose processing unit, and in other embodiments it may be implemented as a special purpose processing unit (e.g., an ASIC). In general, computing device 810 is not limited to any particular type of processing unit or processor subsystem.

Storage subsystem 812 is usable by processing unit 850 (e.g., to store instructions executable by and data used by processing unit 850). Storage subsystem 812 may be implemented by any suitable type of physical memory media, including hard disk storage, floppy disk storage, removable disk storage, flash memory, random access memory (RAM—SRAM, EDO RAM, SDRAM, DDR SDRAM, RDRAM, etc.), ROM (PROM, EEPROM, etc.), and so on. Storage subsystem 812 may consist solely of volatile memory, in one embodiment. Storage subsystem 812 may store program instructions executable by computing device 810 using processing unit 850, including program instructions executable to cause computing device 810 to implement the various techniques disclosed herein.

I/O interface 830 may represent one or more interfaces and may be any of various types of interfaces configured to couple to and communicate with other devices, according to various embodiments. In one embodiment, I/O interface 830 is a bridge chip from a front-side to one or more back-side buses. I/O interface 830 may be coupled to one or more I/O devices 840 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

Unless stated otherwise, the specific embodiments are not intended to limit the scope of claims that are drafted based on this disclosure to the disclosed forms, even where only a single example is described with respect to a particular feature. The disclosed embodiments are thus intended to be illustrative rather than restrictive, absent any statements to the contrary. The application is intended to cover such alternatives, modifications, and equivalents that would be apparent to a person skilled in the art having the benefit of this disclosure.

Particular features, structures, or characteristics may be combined in any suitable manner consistent with this disclosure. The disclosure is thus intended to include any feature or combination of features disclosed herein (either explicitly or implicitly), or any generalization thereof. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

For example, while the appended dependent claims are drafted such that each depends on a single other claim, additional dependencies are also contemplated, including the following: claim 4 (could depend from any of claims 1-3); claim 5 (any preceding claim); claim 6 (claim 5), etc. Where appropriate, it is also contemplated that claims drafted in one statutory type (e.g., apparatus) suggest corresponding claims of another statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to the singular forms such "a," "an," and "the" are intended to mean "one or more" unless the context clearly dictates otherwise. Reference to "an item" in a claim thus does not preclude additional instances of the item.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," covering x but not y, y but not x, and both x and y. On the hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one of element of the set [w, x, y, z], thereby covering all possible combinations in this list of options. This phrase is not to be interpreted to require that there is at least one instance of w, at least one instance of x, at least one instance of y, and at least one instance of z.

Various "labels" may proceed nouns in this disclosure. Unless context provides otherwise, different labels used for a feature (e.g., "first circuit," "second circuit," "particular circuit," "given circuit," etc.) refer to different instances of the feature. The labels "first," "second," and "third" when applied to a particular feature do not imply any type of ordering (e.g., spatial, temporal, logical, etc.), unless stated otherwise.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function. This unprogrammed FPGA may be "configurable to" perform that function, however.

Reciting in the appended claims that a structure is "configured to" perform one or more tasks is expressly intended not to invoke 35 U.S.C. § 112(f) for that claim element. Should Applicant wish to invoke Section 112(f) during prosecution, it will recite claim elements using the "means for" [performing a function] construct.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

What is claimed is:

1. A method, comprising:
    generating, by a computer system, synthetic samples for a trained machine learning model usable to make a classification decision, wherein the generating includes:
        removing, based on a rule specifying a particular feature, the particular feature from a set of existing samples to generate a reduced-feature set of training samples, wherein the removing is performed based on the particular feature failing to comply with the rule, and wherein the particular feature is associated with biased classification decisions in the trained machine learning model;
        selecting a subset of the reduced-feature set of training samples having classification decisions that exceed a confidence threshold, wherein the subset includes less training samples than the reduced-feature set of training samples; and
        reinserting the particular feature into samples in the selected subset, wherein values for the reinserted particular feature in samples in the selected subset are different than values of the particular feature of corresponding samples in the set of existing samples prior to the removing; and
    retraining, by the computer system, the trained machine learning model using the synthetic samples that include new values for the particular feature that is associated with biased classification decisions, wherein the retraining reduces bias in the trained machine learning model; and
    executing, by the computer system, the retrained machine learning model to generate unbiased classifications for one or more new samples.

2. The method of claim 1, wherein the synthetic samples are generated by:
    creating copies of samples in the set of existing samples; and
    replacing values in a particular feature of the copied samples with a value specified in the rule.

3. The method of claim 2, wherein the synthetic samples are further generated by:
    assigning a negative label to the synthetic samples.

4. The method of claim 1, wherein the confidence threshold for the classification decision is determined based on a decision boundary of the trained machine learning model.

5. The method of claim 1, wherein the retraining includes:
    weighting the synthetic samples based on a total number of generated synthetic samples, wherein the synthetic samples are weighted more heavily than the set of existing samples.

6. The method of claim 1, wherein the rule specifies that a first class of samples have a lower threshold for a positive classification label than a second class of samples, and wherein the set of existing samples are selected based on having a classification score that is lower than a standard classification score threshold.

7. The method of claim 6, wherein the synthetic samples are generated to include one or more features associated with the first class of samples, wherein the first class of samples includes a set of favored accounts, and wherein the second class of samples includes a set of non-favored accounts.

8. The method of claim 1, wherein the retraining is further performed using both the synthetic samples and a plurality of existing samples from which the set of existing samples were selected.

9. A non-transitory computer-readable medium having instructions stored thereon that are executable by a computing device to perform operations comprising:
    generating, from an initial set of samples used to train a machine learning model, an augmented set of samples, wherein the generating includes:
        removing a particular feature from one or more of the initial set of samples to generate a reduced-feature set of training samples;
        determining classification scores for samples in the reduced-feature set of training samples;
        selecting a group of the reduced-feature set of samples that meet a confidence threshold, wherein the group includes less training samples than the reduced-feature set of training samples;
        generating synthetic samples by reinserting the particular feature into samples in the selected group, wherein values for the reinserted particular feature in samples in the selected group are different than values of the particular feature in the initial set of samples prior to the removing;
        adding the synthetic samples to the initial set of samples to generate the augmented set of samples; and
    retraining the trained machine learning model using the augmented set of samples that include new values for the particular feature that is associated with biased classification decisions, wherein the retraining reduces bias in the trained machine learning model; and
    generating, using the retrained machine learning model, unbiased classifications for one or more unlabeled samples.

10. The non-transitory computer-readable medium of claim 9, wherein generating the augmented set of samples further includes:
    assigning a positive classification label to the synthetic samples.

11. The non-transitory computer-readable medium of claim 9, wherein the retraining includes:
    determining, based on a ratio of a total number of existing samples included in the augmented set to a total number of synthetic samples, weight values for the synthetic samples; and weighting the synthetic samples based on the determined weight values, wherein weight values for the synthetic samples are greater than weight values for the initial set of samples.

12. The non-transitory computer-readable medium of claim 9, wherein the confidence threshold specifies a threshold difference between a decision boundary of the trained machine learning model and classification scores.

13. The non-transitory computer-readable medium of claim 9, wherein reinserting the particular feature into samples in the selected group is performed based on a value specified in a rule.

14. The non-transitory computer-readable medium of claim 9, wherein reinserting the particular feature into samples of the selected group is performed based on a token.

15. The non-transitory computer-readable medium of claim 14, wherein the token corresponds to characteristics of data being classified by the trained machine learning model that are associated with bias, and wherein the retraining reduces bias of the machine learning model.

16. A method, comprising:
   generating, by a computer system, synthetic samples for a machine learning model trained to make a classification decision based on existing samples, wherein the generating includes:
      removing, based on a token, a particular feature from a set of existing samples to generate a reduced-feature set of training samples, wherein the particular feature is associated with biased classification decisions in the trained machine learning model;
      selecting a subset of the reduced-feature set of training samples having classification decisions that exceed a confidence threshold, wherein the subset includes less training samples than the reduced-feature set of training samples; and
      reinserting the particular feature into samples in the selected subset, wherein values for the reinserted particular feature in samples in the selected subset are different than values of the particular feature of corresponding samples in the set of existing samples prior to the removing; and
   retraining, by the computer system, the machine learning model using the synthetic samples that include new values for the particular feature that is associated with biased classification decisions, wherein the retraining reduces bias in the trained machine learning model; and
   executing, by the computer system, the retrained machine learning model to generate unbiased classifications for one or more new samples.

17. The method of claim 16, wherein the token corresponds to a portion of a name feature, wherein the machine learning model is trained without using an entirety of the name feature, and wherein the synthetic samples each include the token.

18. The method of claim 17, wherein the portion of the name feature is used to retrain the machine learning model.

19. The method of claim 16, wherein the retrained model reduces bias based on the token, wherein the token corresponds to personally identifiable information (PII).

20. The method of claim 16, wherein the retraining is further performed using the existing samples, and wherein the synthetic samples are weighted more heavily than the existing samples.

* * * * *